United States Patent [19]
Tsuda

[11] Patent Number: 6,009,221
[45] Date of Patent: Dec. 28, 1999

[54] DISPERSION SLOPE COMPENSATING OPTICAL FIBER

[75] Inventor: Toshiaki Tsuda, Ichihara, Japan

[73] Assignee: The Furukawa Electric Co., Ltd., Tokyo, Japan

[21] Appl. No.: 09/306,641

[22] Filed: May 7, 1999

Related U.S. Application Data

[63] Continuation of application No. PCT/JP98/04066, Sep. 10, 1998.

[30] Foreign Application Priority Data

| Sep. 10, 1997 | [JP] | Japan | 9-262802 |
| May 26, 1998 | [JP] | Japan | 10-161444 |

[51] Int. Cl.[6] ............................................. G02B 6/16
[52] U.S. Cl. ............................................. 385/123; 385/127
[58] Field of Search ................................. 385/123–128

[56] References Cited

U.S. PATENT DOCUMENTS

| 5,361,319 | 11/1994 | Antos et al. | 385/123 |
| 5,448,674 | 9/1995 | Vengsarkar et al. | 385/123 |
| 5,555,340 | 9/1996 | Onishi et al. | 385/127 |
| 5,673,354 | 9/1997 | Akasaka et al. | 385/127 |
| 5,742,723 | 4/1998 | Onishi et al. | 385/127 |
| 5,781,673 | 7/1998 | Reed et al. | 385/123 X |
| 5,838,867 | 11/1998 | Onishi et al. | 385/123 |

FOREIGN PATENT DOCUMENTS

| 0 674 193 A3 | 9/1995 | European Pat. Off. |
| 0 668 520 A3 | 8/1997 | European Pat. Off. |
| 7-261048 | 10/1995 | Japan |
| 7-270636 | 10/1995 | Japan |
| 8-313750 | 11/1996 | Japan |
| 9-127354 | 5/1997 | Japan |

*Primary Examiner*—John D. Lee
*Attorney, Agent, or Firm*—Lacasse & Associates; Randy W. Lacasse; Wesley L. Strickland

[57] ABSTRACT

The invention relates to a dispersion slope compensating optical fiber which compensates the chromatic dispersion and dispersion slope of a positive dispersion slope optical fiber such as TRUE WAVE and increases reliability of wavelength division multiplex transmission in a wavelength from 1530 nm to 1610 nm. The center core (3) is covered by a side core layer (4), and the outside thereof is covered by a cladding layer (5), wherein the relationship between the relative refractive index differences $\Delta 1$, $\Delta 2$, $\Delta 3$ of the center core (3), side core layer (4) and cladding layer (5) and pure $SiO_2$ glass is established to be $\Delta 1$) $\Delta 3$) $\Delta 2$, $\Delta 2/\Delta 1 = Rd \leq -0.45$, and $\Delta 1 \geq 1.2\%$. The average dispersion slope in a wavelength from 1530 nm to 1610 nm is established to be $-0.6$ $ps/nm^2/km$ or less, and the value obtained by dividing the dispersion value in the same wavelength by a dispersion slope is made 160 or less, wherein by connecting the dispersion shifted optical fiber to TRUE WAVE, whose average dispersion slope in said wavelength is approximately 0.07 to 0.1 $ps/nm^2/km$ and whose dispersion value is greater by approximately 15 to 60 times than the dispersion slope, with a length which is shorter by approximately one-ninth than the length of TRUE WAVE, the dispersion in the said wavelength band can be drawn to nearly zero dispersion.

16 Claims, 5 Drawing Sheets

(a)

(b)

(a)

(b)

$c \geqq 6b$

DISPERSION SLOPE COMPENSATING OPTICAL FIBER

This application is a continuation of PCT/JP98/04066 filed Sep. 10, 1998.

TECHNICAL FIELD

The present invention relates to a dispersion slope compensating optical fiber used for a wavelength division multiplex transmission system having an optical amplifier using an erbium doped optical fiber which is excited by, for example, a pumping light source.

BACKGROUND ART

Recently, in line with realization of an optical amplifier (EDFA: Erbium Doped Fiber Amplifier) using an optical fiber to which erbium is doped, it became possible to directly amplify optical signals in a wavelength band of 1.55 μm (1550 nm) without converting them to electric signals, whereby in a field of optical transmission, high bit rate and long-haul optical transmission has been achieved. Furthermore, on the other hand, transmission is carried out by a wavelength division multiplex system (WDM system) in which optical signals of different wavelengths can be transmitted by a single optical fiber, in order to increase transmission capacity in optical transmission, wherein, by employing an optical amplifier using said erbium doped optical fiber in an optical transmission system in which the wavelength division multiplex system, it can be expected that the transmission capacity is further increased, and a longer haul transmission is further achieved by the wavelength division multiplex system.

Also, as an optical fiber used for a wavelength division multiplex transmission system in which said EDFA is employed, a dispersion shifted optical fiber having zero dispersion wavelength in the wavelength band of 1550 nm has been proposed. However, in a case where an optical fiber has a zero dispersion wavelength in almost the entire gain band of the said EDFA, it is already known that a four-wave mixing (FWM) which is one of the non-linear phenomena occurs when light of a plurality of wavelengths is made incident into the optical fiber. Signal light power is lost due to the four-wave mixing, wherein the original signals are converted to signals of other wavelengths and become noise, resulting in a problem in the transmission characteristics. Furthermore, any one of the conventional dispersion shifted optical fibers has a so-called positive dispersion slope by which the dispersion value (chromatic dispersion value) is increased in line with an increase in wavelength, and the positive dispersion slope by which the dispersion value is generally about 0.07 $ps/nm^2/km$.

Therefore, in order to eliminate the problem resulting from the four-wave mixing, an attempt, by which said problem resulting from the four-wave mixing is solved, has been made by separating the dispersion value at the wavelength used and setting the dispersion value at the wavelength used, so that it becomes ±1.5 ps/nm/km to ±4 ps/nm/km. This is described in Japanese Laid-Open Patent Publication No. 168046 of 1995. An optical fiber which is able to solve the four-wave mixing is registered by the AT & T Corporation with the trademark "TRUE WAVE". Furthermore, the TRUE WAVE is based on the NEO DSF concept (Dispersion shifted optical fiber of the next generation). An optical fiber called TRUE WAVE has a zero dispersion wavelength in the vicinity of wavelength of 1520 nm or in the vicinity of wavelength 1580 nm and has a positive dispersion slope.

Hereinafter, like the TRUE WAVE and the said conventional general dispersion shifted optical fibers, an optical fiber having a positive dispersion slope is called "Positive dispersion slope optical fiber".

Since the dispersion of the positive dispersion slope optical fiber called TRUE WAVE is not zero at the wavelength used as described above, dispersion resulting from the TRUE WAVE itself will occur at the use wavelength band. Therefore, in a case where the TRUE WAVE is used, the following measures are taken. That is, TRUE WAVE having the chromatic dispersion characteristics shown by the characteristics line b1 in FIG. 7 and TRUE WAVE having the chromatic dispersion characteristics shown by the characteristics line b2 in the same drawing are alternately connected to each other, whereby the TRUE WAVE is caused to have, as a whole, chromatic dispersion characteristics shown by the characteristic line b3 in the same drawing, and an attempt is made by which the dispersion at the center wavelength (for example, 1550 nm) of the wavelength is made zero.

However, if so, the dispersion at the center wavelength becomes zero, residual dispersion occurs at wavelengths other than the wavelength, for example, residual dispersion of −1.6 ps/nm/km is produced at a wavelength of 1540 nm, wherein if the relay interval (transmission distance) is 80 Km, dispersion of 128 ps/nm remains. In this case, a difference is produced in the transmission capacity due to dispersion between various wavelengths of signal light at the wavelength band of 1550 nm, the waveform of the signal light is distorted to cause the bit error rate to be changed between the center wave and the end waves, wherein the efficiency of the wavelength division multiplex transmission is lowered and reliability may be remarkably lowered.

Therefore, in Japanese Patent Application No. 85846 of 1997 filed at the Japanese Patent Office, the present applicant proposed a dispersion slope compensating optical fiber in which the dispersion slope of a positive dispersion slope optical fiber of, for example, said TRUE WAVE, etc., is compensated. Furthermore, the dispersion slope compensating optical fiber is an optical fiber which has a dispersion value of a general dispersion shifted optical fiber which is a positive dispersion slope optical fiber, and a negative signed dispersion value, the absolute value of which is equivalent thereto, and has a negative signed dispersion slope, the absolute value of which is equal to that of the dispersion shifted optical fiber.

However, in order to compensate the positive dispersion slope of TRUE WAVE by, for example, connecting the dispersion slope compensating optical fiber to the existing line (optical transmission line) composed of the TRUE WAVE, it is necessary to connect the dispersion slope compensating optical fiber, the length of which is almost equal to that of the TRUE WAVE of the existing line. Therefore, it will become necessary to provide a very long dispersion slope compensating optical fiber. For this reason, it is difficult to insert, as a module, the proposed dispersion slope compensating optical fiber into, for example, a repeater of the existing line and to use it therein.

Furthermore, on the other hand, since the gain band of EDFA is liable to expand to a longer wavelength side, it will become possible to amplify optical signals in the vicinity of a wavelength of 1600 nm. Therefore, the necessity of dispersion slope compensating optical fiber used in this wavelength bandwidth has been increased.

The present invention is developed in order to solve the said problem, and it is therefore an object of the invention to provide a dispersion slope compensating optical fiber which, in the wavelength band, from 1530 nm to 1610 nm in wavelength, which is the gain band of EDFA, is able to almost compensate the chromatic dispersion slope and chromatic dispersion of a positive dispersion slope compensating optical fiber such as TRUE WAVE, etc., by a short optical fiber, and for example, by inserting it into the existing line having a positive dispersion slope for optical transmission as a module, and enables satisfactory wavelength division multiplex transmission at the said wavelength band.

DISCLOSURE OF INVENTION

In order to achieve the said object, a dispersion slope compensating optical fiber is characterized in the following embodiments. That is, the first embodiment of the invention is featured in that in the range from 1530 nm to 1610 nm in wavelength, the average dispersion slope on the wavelength band in the predetermined range is made $-0.6$ ps/nm$^2$/km or less, the dispersion value on the predetermined wavelength band is made $-6$ ps/nm/km or less, and the value (DPS) obtained by dividing the dispersion value by the said dispersion slope is made a positive value which is less than 160.

Furthermore, the second embodiment of the invention is featured in that in the range from 1530 nm to 1610 nm in wavelength, the average dispersion slope on the wavelength band in the predetermined range is made $-1$ ps/nm$^2$/km or less, the dispersion value on the predetermined wavelength band is made $-12.5$ ps/nm/km or less, and the value (DPS) obtained by dividing the dispersion value by said dispersion slope becomes 12 through 80.

Furthermore, the third construction of the invention is featured in that a dispersion slope compensating optical fiber including the first and second embodiments is formed so as to cover the outer circumferential side of the center core by side core layers and cover the outer circumferential side of the corresponding side core layers by a clad layer, wherein $\Delta 1 > \Delta 3$) $\Delta 2$, $\Delta 2/\Delta 1 \leq -0.45$, and $\Delta 1 \geq 1.2\%$ are established where the relative refractive index difference of said center core with respect to pure SiO$_2$ glass is $\Delta 1$, the relative refractive index difference of said side core layer with respect to pure SiO$_2$ glass is $\Delta 2$, and the relative refractive index difference of said clad layer with respect to pure SiO$_2$ glass is $\Delta 3$.

Furthermore, the fourth construction of the invention is featured in that in a dispersion slope compensating optical fiber including said third embodiment, $\Delta 2/\Delta 1 \leq -0.6$ is established.

Furthermore, the fifth embodiment of the invention is featured in that in a dispersion slope compensating optical fiber including said third embodiment, a dopant is added onto said clad layer, which increases the refractive index at an area greater by at least six times than that of the outer diameter of the side core layer with the center of the side core layer used as the center of the dopant.

Furthermore, the sixth embodiment of the invention is featured in that in a dispersion slope compensating optical fiber including the fifth embodiment, the relative refractive index difference of the area, to which a dopant for increasing said refractive index is added with respect to pure SiO$_2$ glass, is established to be 0.35% or more.

Furthermore, the seventh embodiment of the invention is featured in that the said dopant in the said fifth or sixth embodiment is germanium.

Furthermore, the eighth embodiment of the invention is featured in that in a dispersion slope compensating optical fiber including the third or fourth embodiment, $3 \mu m \leq a \leq 6$ $\mu m$, $8 \mu m \leq b \leq 12 \mu m$, and $0.375 \leq a/b \leq -0.55$ are established where the outer diameter of the said center core is "a" and the outer diameter of the side core layer is "b".

In the first embodiment of the invention, since the average dispersion slope on the predetermined wavelength band in the range from 1530 nm to 1610 nm of wavelength is established to be 0.6 ps/nm$^2$/km or less, a positive dispersion slope and a negative dispersion slope are counterbalanced at said predetermined wavelength band from at least 1530 nm to 1610 nm in wavelength by connecting a dispersion slope compensating optical fiber, according to the invention, to a positive dispersion slope optical fiber such as TRUE WAVE having a positive dispersion slope.

Furthermore, in the present specification, the "predetermined wavelength band" averages a wavelength band which is able to compensate both dispersion (chromatic dispersion) and a dispersion slope (chromatic dispersion slope) of a positive dispersion slope optical fiber by a dispersion slope compensating optical fiber according to the invention.

Moreover, the average dispersion slope of a dispersion slope compensating optical fiber, according to the invention, on said predetermined wavelength band in the range from 1530 nm to 1610 nm in wavelength is $-0.6$ ps/nm$^2$/km or less although the average dispersion slope in the range from 1530 nm to 1610 nm in wavelength of TRUE WAVE is approximately 0.07 to 0.1/ps/nm$^2$/km. Therefore, in a case where a dispersion slope compensating optical fiber, according to the invention, is connected to, for example, TRUE WAVE, the average dispersion slope of which is approximately 0.07 ps/nm$^2$/km in the range from 1530 nm to 1610 nm in wavelength, it becomes possible to make the dispersion slope almost zero on the said predetermined wavelength band in the range from 1530 nm to 1610 nm in wavelength, making the length of a dispersion slope compensating optical fiber, according to the invention, shorter by approximately one-ninth or less than the length of TRUE WAVE.

Furthermore, in the first embodiment of the invention, since the value of DPS is a positive value of 160 or less and the maximum value of the DPS of optical fibers currently used for an optical transmission system is approximately 160, it is possible to prevent dispersion, which may adversely influence optical transmission, from remaining, by connecting a dispersion slope shifted optical fiber according to the first embodiment, in which the DPS value is established with respect to a positive dispersion slope optical fiber, the chromatic dispersion value of which is positive. Thereby, the dispersion slope and chromatic dispersion of all positive dispersion slope optical fibers including TRUE WAVE can be compensated, wherein a high-density and high bit rate wavelength division multiplex transmission of high reliability is enabled.

That is, a dispersion slope compensating optical fiber, according to the first embodiment of the invention, is such that the average dispersion slope in the predetermined range in the range from 1530 nm to 1610 nm in wavelength, which will be the gain band of an optical amplifier (EDFA) in which an erbium-doped optical fiber is used, is established to be $-0.6$ ps/nm$^2$/km or less, the dispersion value on the said predetermined wavelength band is established to be $-6$ ps/nm/km or less, and the value obtained by dividing the dispersion value by the said dispersion slope is a positive value of 160 or less. Therefore, the DPS value is set so as to cause the chromatic dispersion value to correspond to a positive dispersion slope optical fiber, and by connecting the dispersion slope compensating optical fiber to a positive dispersion slope optical fiber, it is possible to prevent that dispersion, equivalent to an amount by which optical transmission is hindered, from remaining, wherein dispersion slope and chromatic dispersion of all positive dispersion slope optical fibers, the chromatic dispersion value of which is positive, can be compensated, and it is possible to carry out high-density and high bit rate wavelength division multiplex transmission of high reliability.

Furthermore, in a dispersion slope compensating optical fiber according to the second embodiment, the average dispersion slope in said predetermined wavelength band is established to be $-1$ ps/nm$^2$/km or less. Therefore, for example, in a case where the dispersion slope compensating optical fiber, according to the invention, is connected to TRUE WAVE whose average dispersion slope in the range from 1530 nm to 1610 nm in wavelength is approximately 0.07 ps/nm$^2$/km, with the length of the dispersion slope compensating optical fiber according to the invention made shorter by one-fifteenth than that of TRUE WAVE, it is possible to make the dispersion slope in the said predetermined wavelength band equivalent to almost zero.

Furthermore, a dispersion slope compensating optical fiber according to the second embodiment of the invention is such that the dispersion value in the said predetermined wavelength band is established to be $-12.5$ ps/nm/km or less, and the value obtained by dividing the dispersion value by said dispersion slope is established to be 12 through 80. Therefore, the value (DPS) obtained by dividing the dispersion value in the wavelength of 1530 nm to 1610 nm by the dispersion value is about 75% to 125% of the DPS (approximately 15 to 60) of TRUE WAVE. By connecting TRUE WAVE and a dispersion slope compensating optical fiber according to the invention to each other if the DPS is in this range, no dispersion which hinders optical transmission remains.

Furthermore, in the first and second embodiments of the invention, since either one of the dispersion values in wavelengths in said predetermined range is negative and no zero dispersion wavelength exists in the wavelength band, no four-wave mixing (FWM) is generated in optical transmission in this wavelength range, and high-density and high bit rate wavelength division multiplex transmission of high reliability is enabled.

Therefore, for example, by connecting a dispersion slope compensating optical fiber according to the second embodiment of the invention, which is shorter by one-fifteenth times or less than that of TRUE WAVE, to TRUE WAVE, that is, by inserting the dispersion slope compensating optical fiber according to the invention into the existing line for optical transmission as a module, it is possible to easily make the dispersion value of optical signals almost zero in the wavelength of 1530 nm to 1610 nm, which will be the gain band of EDFA. As a result, in a wavelength division multiplex transmission, signals in the respective wavelengths can be clearly distinguished and separated at the receiving side, wherein high-density and high bit rate wavelength division multiplex transmission of high reliability is enabled.

That is, in a dispersion slope compensating optical fiber according to the second embodiment of the invention, the average dispersion slope in said predetermined range of a range from 1530 nm to 1610 nm in wavelength is established to be $-1$ ps/nm$^2$/km or less and the value obtained by dividing the dispersion value in said predetermined wavelength band by said dispersion slope is caused to become 12 through 80. Therefore, if a dispersion slope compensating optical fiber according to the invention is connected to, for example, a positive dispersion slope optical fiber (TRUE WAVE) whose average dispersion slope is approximately 0.07 to 0.1 ps/nm$^2$/km in a wavelength from 1530 nm to 1610 nm and dispersion value in the same wavelength band is greater by about 15 to 60 times than that of the dispersion slope, both the dispersion and dispersion slope of TRUE WAVE can be compensated with a length which is shorter by about one-fifteenth or less than the length of TRUE WAVE, and it is possible to cause the dispersion slope in said wavelength band to be drawn to nearly zero.

Accordingly, a dispersion slope compensating optical fiber according to the second embodiment of the invention can be easily incorporated, as a module, into a relay station of the existing line, which is composed of positive dispersion slope optical fibers such as TRUE WAVE, etc., and it is possible to easily construct a wavelength division multiplex transmission system in a wavelength band of 1550 nm, which is provided with EDFA (Erbium doped fiber amplifiers). Furthermore, the dispersion at the gain band of the EDFA, which is the wavelength in the system, can be made almost zero in the entire use wavelength band, and the four-wave mixing which is one of linear phenomena, can be prevented from occurring, where it becomes possible to construct an optical transmission system which enables reliable high-density and high bit rate transmission of high reliability.

Furthermore, the dispersion slope compensating optical fiber is such that the outer circumferential side of the center core is covered by a side core layer and the outer circumferential side of the corresponding side cover layer is covered by a clad layer, wherein $\Delta 1) \Delta 3) \Delta 2$, $\Delta 2/\Delta 1 \leq -0.45$, and $\Delta 1 \geq 1.2\%$ are established where the relative refractive index difference of said center core with respect to pure SiO$_2$ glass is $\Delta 1$, the relative refractive index difference of said side core layer with respect to pure SiO$_2$ glass is $\Delta 2$, and the relative refractive index difference of said clad layer with respect to pure SiO$_2$ glass is $\Delta 3$. According to the third embodiment of the invention, in which $\Delta 1 \geq 1.2\%$ is established, if the refractive index structure of a dispersion slope compensating optical fiber is constructed as described above, it is possible to easily and securely form a dispersion slope compensating optical fiber provided with chromatic dispersion characteristics, which is able to perform said satisfactory compensation of dispersion and dispersion slope.

Furthermore, according to the fourth embodiment in which $\Delta 2/\Delta 1 \leq -0.6$ is established in addition to the third embodiment of the invention, it is possible to further easily and securely form a dispersion slope compensating optical fiber provided with chromatic dispersion characteristics, which is able to perform said satisfactory compensation of dispersion and dispersion slope.

Furthermore, according to the fifth embodiment of the invention, in which a dopant for increasing the refractive index is added to the clad layer at an area, which is greater by at least six times than the outer diameter of the side core layer, with the center thereof made identical to that of the side core layer, since the relative refractive index difference of the optical transmission area (an area which is greater by about six times than the outer diameter of the side core layer with the center thereof made identical to that of the side core layer) with respect to pure SiO$_2$ glass can be increased by providing the clad layer with an area to which a dopant for increasing the refractive index is added, it is possible to decrease the optical transmission loss, and the transmission loss of a dispersion slope compensating optical fiber can be lowered.

Furthermore, according to the embodiments of the invention in which the relative refractive index difference of the area, to which a dopant for increasing the refractive index is added, with respect to pure $SiO_2$ glass is established to be 0.35% or more, since it is possible to further increase the relative refractive index difference of the said optical transmission area with respect to pure $SiO_2$ glass, high-density and high bit rate wavelength division multiplex transmission of further higher reliability is enabled.

Furthermore, according to the embodiment of the invention in which the dopant to be added to said clad layer is germanium, it is possible to easily increase the relative refractive index difference with respect to pure $SiO_2$ glass at the optical propagation area on the clad layer.

Furthermore, in the eighth embodiment of the invention, in which 3 $\mu m \leq a \leq 6$ $\mu m$, 8 $\mu m \leq b \leq 12$ $\mu m$, and $0.375 \leq a/b \leq 0.55$ are established where the outer diameter of said center core is "a" and the outer diameter of the side core layer is "b", it is possible to favorably compensate the dispersion and dispersion slope, and it is possible to very easily obtain a dispersion slope compensating optical fiber suitable for high-density and high bit rate wavelength division multiplex transmission of higher reliability.

BEST MODE FOR CARRYING OUT THE INVENTION

A detailed description is given of the invention with reference to the accompanying drawings.

Figure 1:
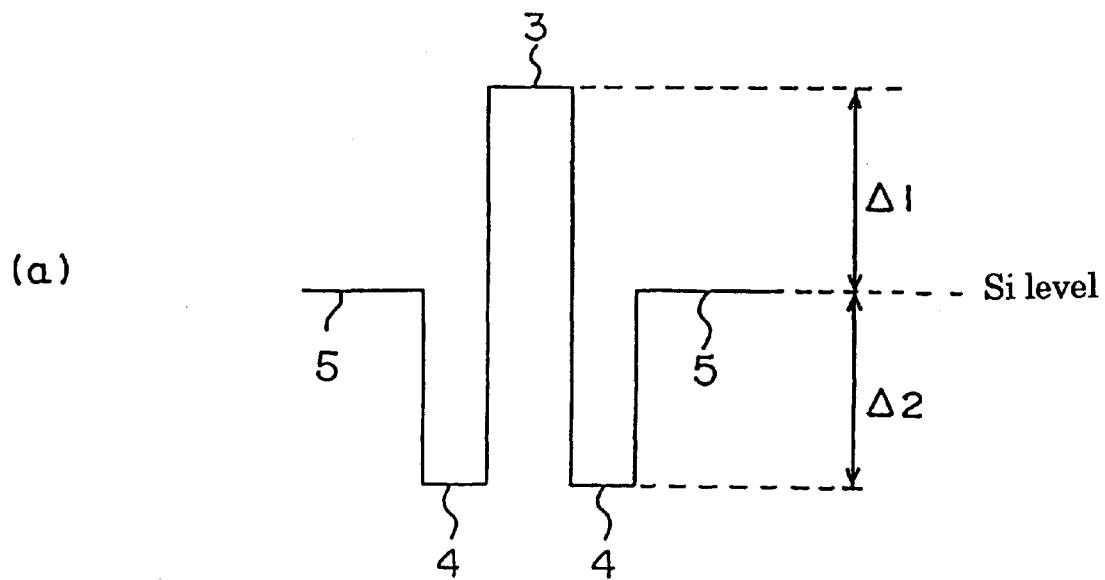
FIGS. 1(a) and 1(b) are configurational views showing a refractive index profile structure (a) and cross-section (b) of the first preferred embodiment of a dispersion slope compensating optical fiber according to the invention.
Figure 1:
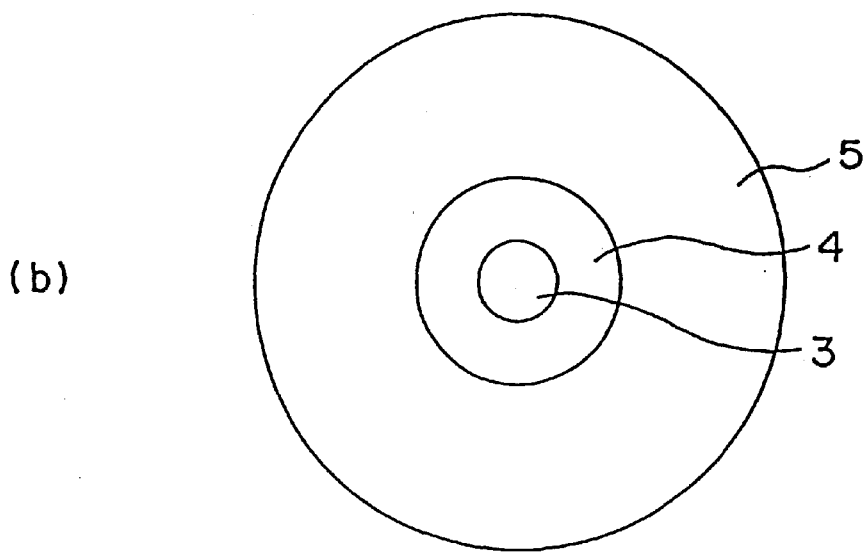

(a) in FIG. 1 shows the refractive index profile characteristics according to the first embodiment of a dispersion slope compensating optical fiber according to the invention, and (b) therein shows a cross-sectional view of the dispersion slope compensating optical fiber.

As shown in these drawings, a dispersion slope compensating optical fiber according to the embodiment of the invention is formed so that the outer circumferential side of the center core 3 is covered by a side core layer 4 and the outer circumferential side of the side core layer 4 is covered by a clad layer 5, wherein the clad layer 5 is formed of pure $SiO_2$ glass. Furthermore, $\Delta 1$) $\Delta 3$) $\Delta 2$ is established and a W-shaped refractive index profile is presented where the relative refractive index difference of the center core 3 with respect to pure $SiO_2$ glass is $\Delta 1$, the relative refractive index difference of the side core layer 4 with respect to pure $SiO_2$ glass is $\Delta 2$, and the relative refractive index difference of the clad layer 5 with respect to pure $SiO_2$ glass is $\Delta 3$. Furthermore, $\Delta 2/\Delta 1$=Rd $\leq -0.45$ and $\Delta 1 \geq 1.2\%$ are established. In particular, it is preferable that Rd$\leq -0.6$ is established.

Furthermore, in the present specification, where the refractive index of pure $SiO_2$ glass (Silica: $SiO_2$) is $n_0$, the refractive index of the clad layer 5 is $n_L$, the refractive index of the side core layer 4 is $n_S$, and the refractive index of the center core 3 is $n_C$, the relative refractive index difference $\Delta 1$ of the center core 3 with respect to pure $SiO_2$ glass is defined by the following expression (1):

$$\Delta 1 = \{(n_C^2 - n_0^2)/2n_C^2\} \times 100 \qquad (1)$$

Furthermore, the relative refractive index difference $\Delta 2$ of the side core layer 4 with respect to pure $SiO_2$ glass is defined by the following expression (2):

$$\Delta 2 = \{(n_S^2 - n_0^2)/2n_S^2\} \times 100 \qquad (2)$$

Furthermore, the relative refractive index difference $\Delta 3$ of the clad layer 5 with respect to pure $SiO_2$ glass is defined by the following expression (3): Furthermore, in the present embodiment, since the clad layer 5 is made of pure $SiO_2$ glass (Silica), $n_L = n_0$. Therefore, $\Delta 3 = 0$.

$$\Delta 3 = \{(n_L^2 - n_0^2)/2n_L^2\} \times 100 \qquad (3)$$

A dispersion slope compensating optical fiber according to the embodiment is provided with the refractive index profile characteristics described above, wherein the average dispersion slope in the wavelength from 1530 nm to 1610 nm is established to be $-1.00$ ps/nm$^2$/km or less, the dispersion value in the same wavelength band is established to be $-12.5$ ps/nm/km or less, and the value obtained by dividing the dispersion value by the dispersion slope is 12 through 80 (preferably, 15 through 60). Thereby, in the present embodiment, the average dispersion slope, for example, in an optional range of 30 nm of the predetermined range in the range from 1530 nm to 1610 nm in wavelength is established to be $-1.00$ ps/nm$^2$/km or less, the dispersion value is established to be $-12.5$ ps/nm/km or less, and the value obtained by dividing the dispersion value by the dispersion slope is established to be 12 through 80 (preferably 15 through 60).

Furthermore, in a dispersion slope compensating optical fiber according to the embodiment, 3 $\mu m \leq a \leq 6$ $\mu m$, 8 $\mu m \leq b \leq 12$ $\mu m$, and $0.4 \leq a/b \leq 0.5$ are established where the outer diameter of said center core 3 is "a" and the outer diameter of the side core layer 4 is "b".

Furthermore, in order to cause the positive dispersion slope of TRUE WAVE to become almost zero by connecting a dispersion slope compensating optical fiber according to the embodiment, the length of which is approximately one-ninth that of TRUE WAVE, to TRUE WAVE, the average dispersion slope of which is approximately 0.07 ps/nm$^2$/km in, for example a wavelength from 1530 nm to 1610 nm, since the average dispersion slope of the said TRUE WAVE with respect to the wavelength from 1530 nm to 1610 nm is approximately 0.07 to 0.1 ps/nm$^2$/km, it is necessary that the average dispersion slope in the wavelength band of said optional 30 nm in the range from 1530 nm to 1610 nm in wavelength is established to be −0.6 ps/nm$^2$/km.

Furthermore, in order to make the positive dispersion slope of said TRUE WAVE almost zero by connecting a dispersion slope compensating optical fiber according to the embodiment, the length of which is approximately one-fifteenth or less that of the TRUE WAVE, it is necessary that the average dispersion slope in the wavelength band of said optional 30 nm is established to be −1 ps/nm$^2$/km or less.

Furthermore, if the value (DPS) obtained by dividing the dispersion value of a dispersion slope compensating optical fiber according to the embodiment in a wavelength band of said optional 30 nm by the dispersion slope is made 75% to 125% of the DPS of TRUE WAVE, no dispersion equivalent to an amount by which hindrance is generated in optical transmission is permitted to remain in said wavelength band by connecting a dispersion slope compensating optical fiber according to the invention and TRUE WAVE to each other. Furthermore, if the DPS of a dispersion slope compensating optical fiber according to the embodiment is made almost equal to the DPS of TRUE WAVE, the residual dispersion can be made almost zero. Therefore, it is preferable that both DPS are made almost equal to each other.

Figure 2:
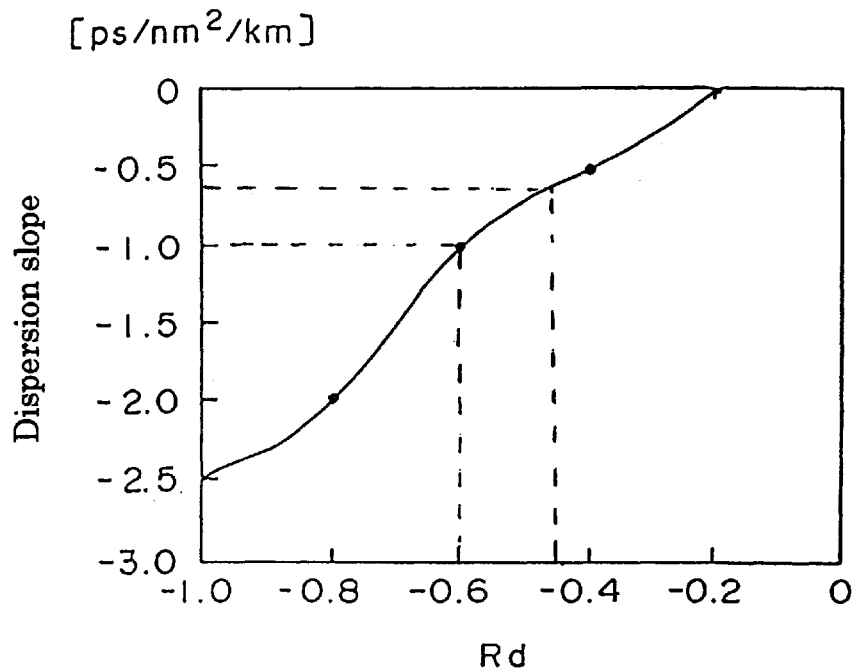
FIG. 2 is graph showing the relationship between a ratio ($\Delta 2/\Delta 1$=Rd) of the relative refractive index difference $\Delta 2$ of an optical fiber having a W-shaped refractive index profile shown in (a) with respect to pure $SiO_2$ glass and the relative refractive index difference $\Delta 1$ of the center core with pure $SiO_2$ glass and the average dispersion slope at an optionally predetermined wavelength band of 30 nm in the range from 1530 nm to 1630 nm in wavelength.

Therefore, the following experiment was carried out as regards an optical fiber having said W-shaped refractive index profile in order to obtain a dispersion slope compensating optical fiber in which the dispersion slope and DPS become the values described above. First, the ratio (Δ2/Δ1= Rd) of the relative refractive index difference Δ2 of the side core layer 4 for pure SiO$_2$ glass with respect to the relative refractive index difference Δ1 (the relative refractive index difference Δ1 of the center core 3 with respect to pure SiO$_2$ glass) of the center core 3 for pure SiO$_2$ glass was used as a parameter, and the dispersion slope of the optical fiber was measured while variously changing the Rd, wherein the relationship between Rd and the dispersion slope was examined. Furthermore, at this time, the value of a/b was kept constant. The result thereof is shown in FIG. 2. As has been made clear in FIG. 2, it is understood that it is necessary to set the Rd to −0.45 or less in order to make the dispersion slope −0.6 ps/nm$^2$/km, and it is necessary to set the Rd to −0.6 or less in order to make the dispersion slope −1 ps/nm$^2$/km.

Figure 3:
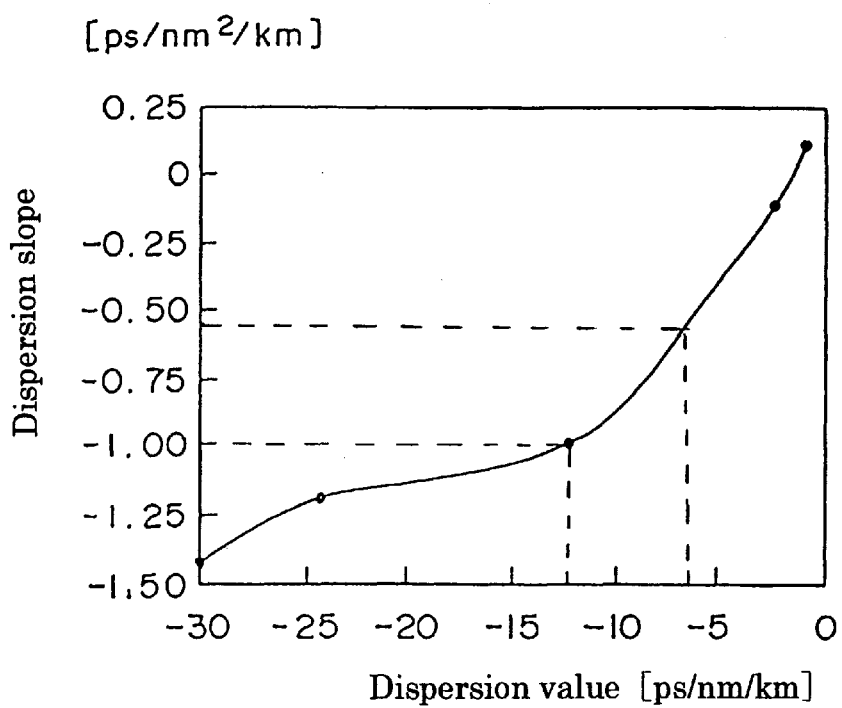
FIG. 3 is a graph showing the relationship between the dispersion value and average dispersion slope of an optical fiber having a W-shaped refractive index profile shown by (a) in FIG. 1, in an optionally predetermined wavelength band of 30 nm in the range from 1530 nm to 1610 nm in wavelength.

Furthermore, the relationship between the average dispersion slope and dispersion value of an optical fiber in an optional 30 nm wavelength band in the range from 1530 nm to 1610 nm in wavelength was examined, wherein the result shown in FIG. 3 could be obtained. As has been made clear in the same drawing, it is understood that it is necessary to set the dispersion value to approximately −6 ps/nm/km or less in order to make the average dispersion slope of an optical fiber −0.6 ps/nm$^2$/km or less, and it is necessary to set the dispersion value to approximately −12.5 ps/nm/km or less in order to make the average dispersion slope of an optical fiber −1 ps/nm$^2$/km or less. Furthermore, for example, where the average dispersion slope of an optical fiber is determined to −1 ps/nm$^2$/km and the dispersion value thereof is determined to be −12.5 ps/nm/km, the DPS is made 12.5, and if the average dispersion slope is determined to be −1.25 ps/nm$^2$/km, the dispersion value is made approximately −27 ps/nm/km and the DPS thereof is made 21.6. Therefore, for example, on the basis of the data of the relationship shown in FIG. 3, it is possible to determine the dispersion slope and dispersion value so that the DPS becomes 12 through 80.

Figure 4:
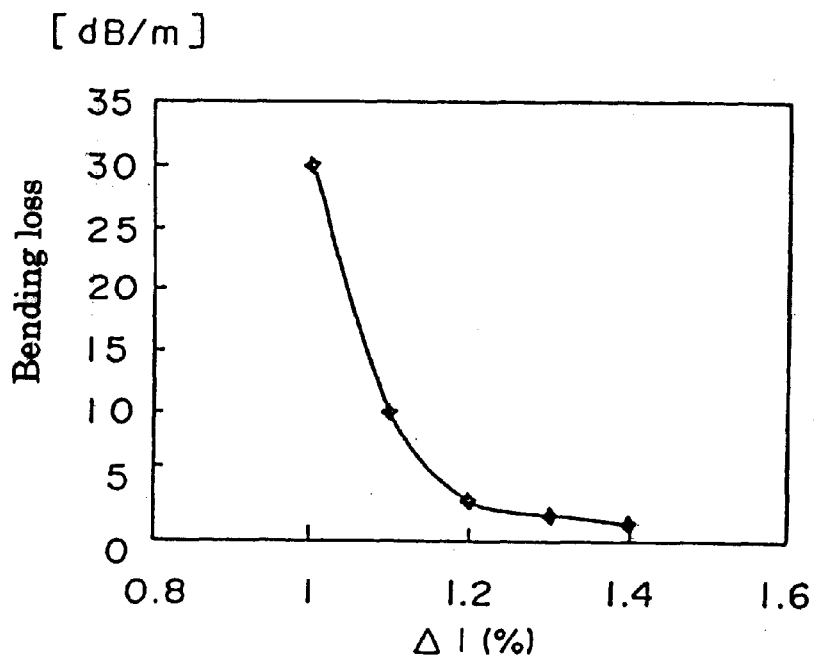
FIG. 4 is a graph showing the relationship between the relative refractive index difference $\Delta 1$ of the center core with respect to pure $SiO_2$ glass in an optical fiber having a W-shaped refractive index profile shown by (a) in FIG. 1 and the bending loss of the optical fiber.

The loss (transmission loss) resulting from light leakage when propagating light in an optical fiber while variously varying the relative refractive index difference Δ1 of the center core 3 with respect to the clad layer 5 with Δ1 used as a parameter was measured. For example, as shown in FIG. 4, as Δ1 becomes a value which is less than 1.2%, the loss resulting from the light leakage was made greater, wherein it was confirmed that it would become difficult to use the optical fiber as an optical transmission line. Furthermore, FIG. 4 shows the values of bending loss when a dispersion slope optical fiber is bent with a bending radius of 20 mm, in order to investigate the loss resulting from said light leakage.

On the basis of said experiment, a dispersion slope compensating optical fiber according to the embodiment of the invention has, as described above, a W-shaped refractive index profile structure as shown by (a) in FIG. 1, and it is made such that Δ2/Δ1=Rd≦−0.45 (preferably, Rd≦−0.6) and Δ1≧1.2% are established, the average dispersion slope in the said optional wavelength of 30 nm in the range from 1530 nm to 1630 nm in wavelength is established to be −0.6 ps/nm$^2$/km or less (preferably, −1.00 ps/nm$^2$/km or less), the dispersion value in the same wavelength band is established to −6 ps/nm/km or less (preferably −12.5 ps/nm/km or less), and said DPS is established to be 12 through 80 (preferably 15 through 60).

Furthermore, when producing dispersion slope compensating optical fibers as described above, they were produced while varying the outer diameter "a" of the center core 3 and the outer diameter "b" of the side core layer 4 and varying the value of a/b. When 3 μm≦a≦6 μm, 8 μm≦b≦12 μm, and 0.4≦a/b≦0.5 were established in order to cause dispersion slope compensating optical fibers to have such average dispersion slope and dispersion values as described above in said optional wavelength band of 30 nm in the wavelength from 1530 nm to 1610 nm, it was confirmed that it is possible to easily produce dispersion slope compensating optical fibers having said characteristics.

Accordingly, as a practical example of the embodiment of the invention, a dispersion slope compensating optical fiber, 2.7 km long, whose average dispersion slope is −1.05 ps/nm$^2$/km and zero dispersion wavelength is 1515 nm in said optional wavelength band of 30 nm in the range from 1530 nm to 1610 nm in wavelength was prepared and connected to TRUE WAVE whose zero dispersion wavelength is 1515 nm and average dispersion slope in the wavelength from 1530 nm to 1610 nm is 0.07 ps/nm$^2$/km, wherein both the dispersion slope and chromatic dispersion in said optional wavelength band of 30 nm were shifted, and the dispersion in the said wavelength band was made ±0.03 ps/nm/km or so. That is, almost zero dispersion could be obtained.

Furthermore, if a dispersion slope compensating optical fiber whose dispersion slope in said wavelength band is, for example, −0.07 ps/nm$^2$/km is connected to TRUE WAVE having said dispersion characteristics, it is possible to make the dispersion in said wavelength band almost zero (±0.03 ps/nm/km). However, in this case, it will be necessary to prepare a dispersion slope compensating optical fiber which has almost the same length as that of TRUE WAVE, that is, 40 km long. Therefore, it becomes difficult to insert, as a module, the dispersion slope compensating optical fiber into a repeater of the existing line composed of TRUE WAVE.

According to the embodiment of the invention, since, as described above, both the dispersion slope and chromatic dispersion in the wavelength band from 1530 nm to 1610 nm in wavelength are shifted by a length which is, for example, approximately one-fifteenth of the TRUE WAVE and the chromatic dispersion can be made almost zero dispersion, it is possible to easily insert, as a module, a dispersion slope compensating optical fiber according to the embodiment of the invention, into a repeater of the existing line composed of TRUE WAVE, whereby the dispersion at said wavelength band can be made almost zero dispersion.

Furthermore, since, a dispersion slope compensating optical fiber according to the embodiment of the invention is such that the dispersion of the wavelength band of an optional wavelength band of 30 nm in the range from 1530 nm to 1610 nm in wavelength, which will become the gain band of an optical amplifier (EDFA) having an erbium-doped optical fiber, is −12.5 ps/nm/km or less, and has no zero dispersion wavelength in said optional wavelength band of 30 nm, there is almost no case where the four-wave mixing (FWM) occurs when signal light of a wavelength band of 1550 nm (approximately 1530 nm to 1610 nm in wavelength) is made incident into the dispersion slope compensating optical fiber. Furthermore, generation of the FWM is suppressed in TRUE WAVE as described above.

Therefore, if a dispersion slope compensating optical fiber according to the embodiment of the invention is connected to TRUE WAVE which is the object to be connected and is applied to a wavelength division multiplex transmission system at a wavelength band of 1550 nm, which is provided with an EDFA, it is possible to construct an optical transmission system which does not generate any FWM and in which the chromatic dispersion is made almost zero at the receiving end in the entire wavelength band, and an excellent optical transmission system enables high-density and high bit rate wavelength division multiplex transmission of very high reliability can be constructed.

FIG. 5(a) shows refractive index profile characteristics of the second embodiment of a dispersion slope compensating optical fiber according to the invention, and FIG. 5(b) shows a cross-sectional view of the dispersion slope compensating optical fiber. Although a dispersion slope compensating optical fiber according to the second embodiment is constructed to be nearly similar to the first embodiment, in the second embodiment, germanium (Ge) is added, as a dopant to increase the refractive index, onto an area, which is greater by at least six times than the outer diameter of the side core layer, on the clad layer 5 with the center thereof made identical to that of the side core layer 4. As shown in the following expression (4), the relative refractive index difference Δ3 of the area with respect to pure $SiO_2$ glass is established to be 0.35% or more.

$$\Delta 3a = \{n_{La}^2 - n_0^2)/2n_{La}^2\} \times 100 \qquad (4)$$

where $n_{La}$ indicates the refractive index of said area.

Figure 5:
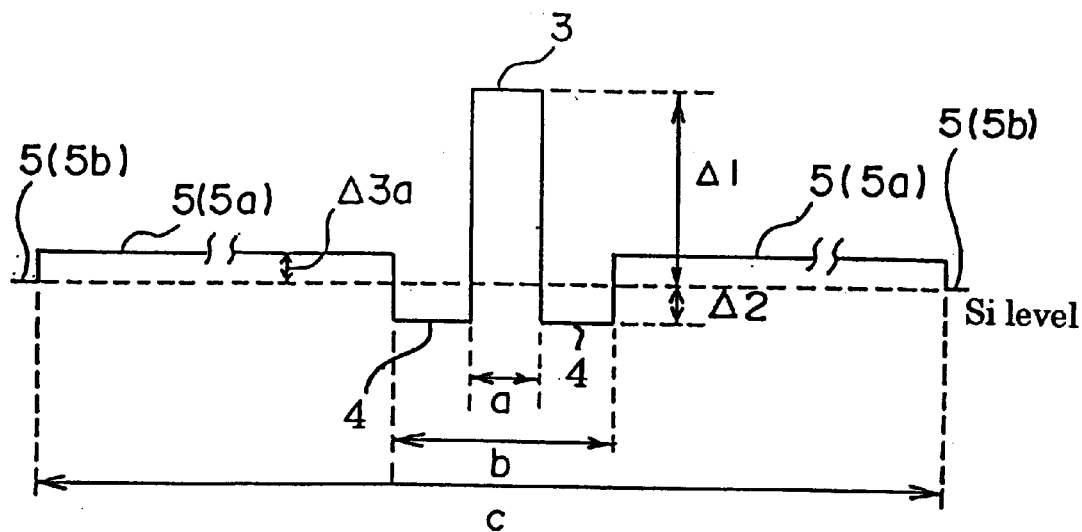
FIGS. 5(a) and 5(b) are configurational views showing the refractive index profile structure (a) and cross section (b) of the second embodiment of a dispersion slope compensating optical fiber according to the invention.
Figure 5:
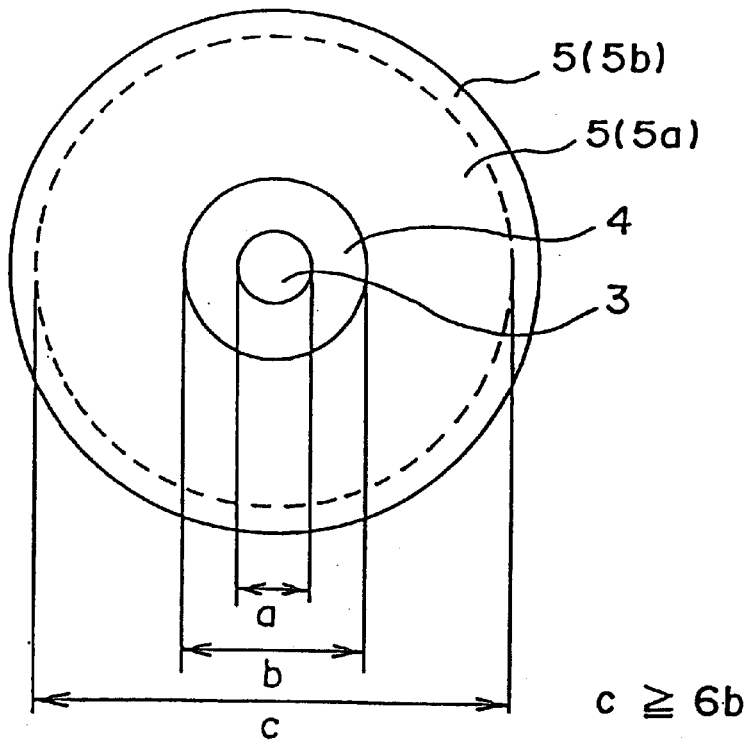
Figure 7:
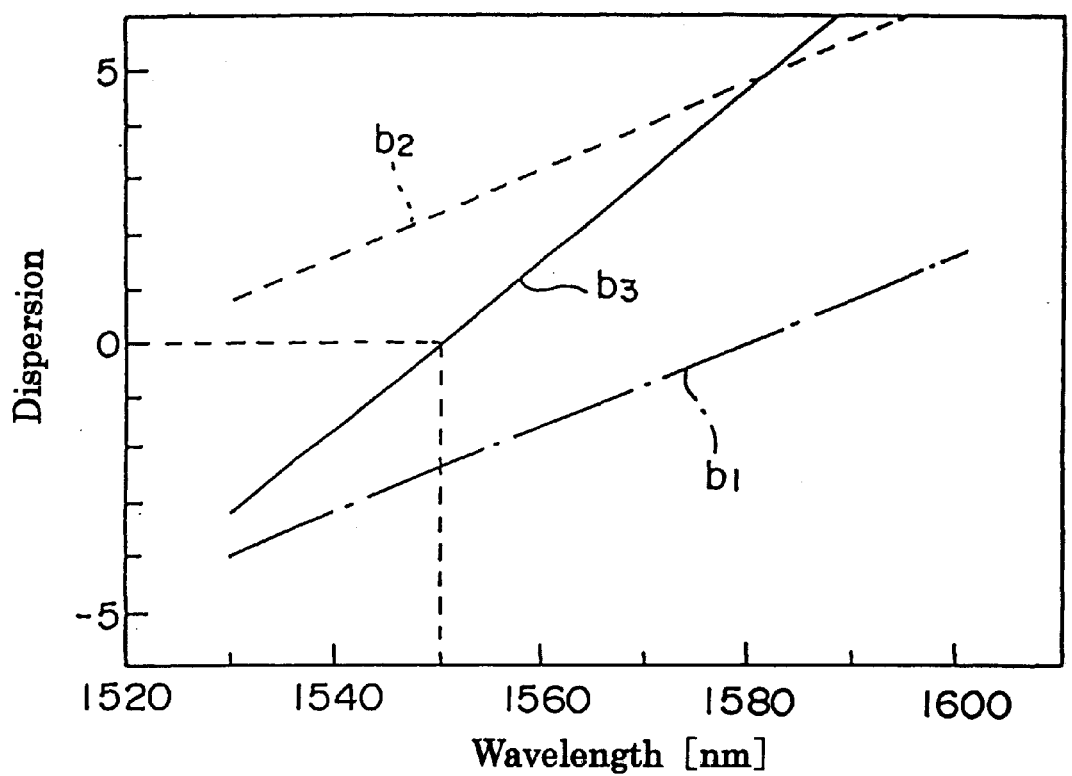
FIG. 7 is a graph showing chromatic dispersion characteristics of TRUE WAVE which is one example of conventionally proposed positive dispersion slope optical fibers.

In other words, in the second embodiment, as shown in FIG. 5, the clad layer 5 has an inner clad layer 5a and an outer clad layer 5b, and germanium (Ge) is doped onto the inner clad layer 5a, wherein the relative refractive index difference Δ3 of the inner clad layer 5a with respect to pure $SiO_2$ glass is established to be 0.35%. Furthermore, the outer diameter "a" of the inner clad layer 5a is made greater by approximately six times than the outer diameter "b" of the side core layer 4 (c≧6b). Furthermore, the outer clad layer 5b is omitted, and the relative refractive index difference Δ3 of the clad layer 5 with respect to pure $SiO_2$ glass may be made 0.35% or more with germanium doped onto the entire area of the clad layer 5.

In the second embodiment, as described above, the viscosity of the center core 3, side core layer 4 and clad layer 5 is made to approach each other by doping germanium (Ge) onto the clad layer 5.

Figure 6:
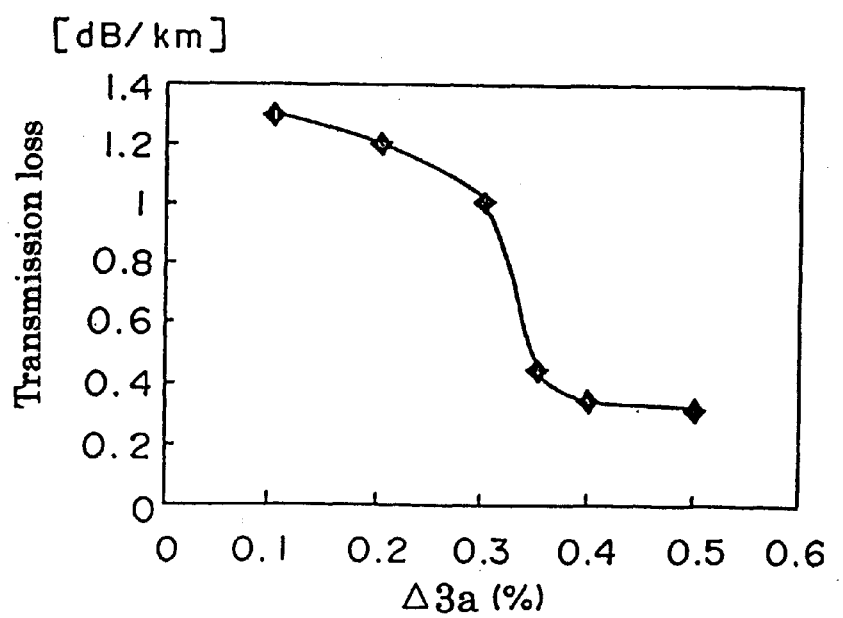
FIG. 6 is a graph showing the relationship between the relative refractive index difference $\Delta 3a$ of the inner clad layer 5a with respect to pure $SiO_2$ glass in an optical fiber having a refractive index profile shown by (a) in FIG. 5 and the optical transmission loss of the optical fiber.

When specifying the construction of the second embodiment of the invention, the present applicant investigated the relationship between the relative refractive index difference Δ of the optical propagation area with respect to pure $SiO_2$ glass and the optical transmission loss of the dispersion slope compensating optical fiber. That is, the applicant investigated said relationship while varying the relative refractive index difference Δ of said area with respect to pure $SiO_2$ glass with a dopant such as germanium (Ge) for increasing the refractive index added onto the area, which is greater by at least six times than the outer diameter of the side core layer 4, on the clad layer 5 with the center thereof made identical to that of the side core layer 4. The results are shown in FIG. 6.

As has been made clear in this drawing, if said relative refractive index difference Δ is increased more than zero, the optical transmission loss is decreased. In particular, it is understood that the optical transmission loss is radically decreased as said relative refractive index difference Δ exceeds 0.35%. Therefore, as described above, the second preferred embodiment is constructed so that germanium (Ge) is doped at an area, which is greater by at least six times than the outer diameter of the side core layer 4, on the clad layer 5 with the center thereof made identical to that of the side core layer 4 and the relative refractive index difference Δ3a of the area with respect to pure $SiO_2$ glass exceeds 0.35%. Furthermore, in addition to that the relative refractive index difference Δ of said area with respect to pure $SiO_2$ glass is increased if a germanium dopant is added onto the clad layer 5, the viscosities of the center core 3, side core layer 4 and clad layer 5 are made to approach each other each other, wherein it is considered that a lowering of the optical transmission loss can be achieved as described above.

With the second embodiment, since it has a refractive index profile structure as shown in FIG. 5, the second embodiment provides effects similar to those of the first embodiment. Furthermore, since the second embodiment is constructed so that germanium (Ge) is doped at an area, which is greater by at least six times than the outer diameter of the side core layer 4, on the clad layer 5 with the center thereof made identical to that of the side core layer 4 and the relative refractive index difference Δ3a of the area with respect to pure $SiO_2$ glass exceeds 0.35%, it is possible to further lower the optical transmission loss than in the first embodiment.

A dispersion slope compensating optical fiber according to the second embodiment can be produced by, for example, detailed production examples 1 through 7 described below.

PRODUCTION EXAMPLE 1

First, a center core 3 containing germanium (Ge) is composed by a VAD method (Vapor-phase Axial Deposition Method) using one burner, and it is vitrified thereafter. A side core layer 4 is formed on the center core 3 by an outside attaching method, wherein when vitrifying, fluorine is doped onto the side core layer 4 to form a fluorine-doped layer. Furthermore, germanium (Ge) is high-doped (doped at a high concentration) on a clad layer 5 by a Ge-OVD (germanium doped Outside Vapor-phase Deposition) method, whereby a dispersion slope optical fiber is produced.

PRODUCTION EXAMPLE 2

First, both the center core 3 and side core layer 4 are formed as in the production example 1, and germanium is high-doped onto the clad layer 5 by the VAD method. Thereafter, it is vitrified to be made into a dispersion slope optical fiber.

PRODUCTION EXAMPLE 3

First, both the center core 3 and side core layer 4 are produced as in the production examples 1 and 2. A substance in which the side core layer 4 is provided around the center core 3 is called a "core body". The clad layer 5 is formed so that a germanium (Ge) doped quartz bar is made into pipe, and the pipe of the clad layer 5 is attached by jacket to the said core body (the core body is inserted into the pipe, wherein the core body and clad layer 5 are made integral with each other by heating them), thereby producing a dispersion slope optical fiber.

PRODUCTION EXAMPLE 4

First, the center core 3 and side core layer 4 are formed as in the production examples, 1, 2, and 3, and the clad layer 5 is formed, as a core body, of a Ge tube composed by a MCVD (Modified Chemical Vapor Deposition) method, wherein the Ge tube is attached by jacket to the core body, thereby producing a dispersion slope optical fiber.

PRODUCTION EXAMPLE 5

First, the center core 3 containing Ge is composed by the VAD method using one burner and is vitrified thereafter. A side core layer 4 and a clad layer 5 are formed on the center core 3 in order by the outside attaching method, and when vitrifying the side core layer 4, boron is co-doped along with fluorine in order to obtain a fluorine-boron co-doped layer. Ge is doped when composing the clad layer 5, in order to make a Ge-doped layer. Thereafter, a dispersion slope optical fiber is produced by vitrifying them.

PRODUCTION EXAMPLE 6

The center core 3 of a Ge-doped layer, side core layer 4 of a fluorine-doped layer, and clad layer 5 of a Ge-doped layer are composed by the MCVD method sequentially from the clad layer 5, thereby producing a dispersion slope optical fiber.

PRODUCTION EXAMPLE 7

The center core 3 of a Ge-doped layer, side core layer 4 of a fluorine and boron co-doped layer and clad layer 5 of a Ge-doped layer are composed by the MCVD method sequentially from the clad layer 5, thereby producing a dispersion slope compensating optical fiber.

A dispersion slope compensating optical fiber according to the second embodiment is produced by producing an optical fiber by individually forming the center core 3, side core layer 4 and clad layer 5, using the production methods described above. By producing an optical fiber as described above, it is possible to obtain a dispersion slope optical fiber which is able to provide such excellent effects as described above.

Furthermore, for comparison, the present applicant formed two or more layers at the same time in various manners, that is, the center core 3, side core layer 4 and clad layer 5 are simultaneously composed by the VAD method using, for example, three burners while the center core 3 and side core layer 4 are simultaneously composed by the VAD method using two burners, and vitrified in a fluorine atmosphere, and Ge is thereafter highly doped onto the clad layer 5 by using the Ge-OVD method, and two or more layers are simultaneously formed by using a jacket-attaching method while the center core 3 and side core layer 4 are simultaneously composed by the VAD method using two burners. However, in any one of the above cases, it was not possible to form a dispersion slope optical fiber of the second embodiment having a refractive index profile structure as shown in FIG. 5.

One reason as to why, for example, considers that when simultaneously composing the center core 3 and side core layer 4 and simultaneously vitrifying them, fluorine is also doped onto the center core 3 when attempting to dope fluorine onto the side core layer 4.

Furthermore, the invention is not limited to the said embodiments. Various modifications and variations are available. For example, although, in the said second embodiment, germanium dopant is added onto the clad layer 5 to increase the refractive index of the clad layer 5, and the dopant added onto the clad layer 5 is not necessarily limited to germanium. It may be any dopant other than germanium if it has the ability to increase the refractive index, for example, phosphate (P), and aluminium (Al), etc., may be doped onto the clad layer 5.

Furthermore, in each of the said embodiments, an optional wavelength band of 30 nm in the range from 1530 nm to 1610 nm in wavelength is established as a wavelength band which compensates the chromatic dispersion and dispersion slope of a positive dispersion slope optical fiber by a dispersion slope compensating optical fiber according to the respective embodiments. However, the wavelength band thus predetermined may be a wider wavelength band than 30 nm, and no specified limitation is provided for the amplitude, upper limit and lower limit thereof if the wavelength is within the range from 1530 nm to 1610 nm in wavelength. The wavelength band may be promptly determined.

Furthermore, in the respective embodiments, the average dispersion slope of a wavelength band in the predetermined range, for example, 30 nm in the range from 1530 nm to 1610 nm in wavelength is established to be $-1.05$ ps/nm$^2$/km as in the example detailed. However, if a dispersion slope compensating optical fiber according to the invention meets the condition that the average dispersion slope in the predetermined wavelength band in the range from 1530 nm to 1610 nm in wavelength becomes $-0.6$ ps/nm$^2$/km or less (preferably, $-1$ ps/nm$^2$/km or less), the slope may not be specified.

For example, where the average dispersion slope of a dispersion slope compensating optical fiber in said predetermined wavelength band is established to be $-0.6$ ps/nm$^2$/km or less, if a dispersion slope compensating optical fiber constructed as described above is connected to TRUE WAVE whose average dispersion slope in the wavelength band is 0.07 ps/nm²/km, it is possible to make the dispersion slope of TRUE WAVE almost zero with a length which is one-ninth of the length of TRUE WAVE. Furthermore, where the average dispersion slope of a dispersion slope compensating optical fiber in said predetermined wavelength band is established to be $-1$ ps/nm²/km or less, if a dispersion slope compensating optical fiber constructed as described above is connected to TRUE WAVE whose average dispersion slope in the wavelength band is 0.07 ps/nm²/km, it is possible to make the dispersion slope of TRUE WAVE almost zero with a length which is approximately one-fifteenth of the length of TRUE WAVE.

Furthermore, although the zero dispersion wavelength of a dispersion slope compensating optical fiber is established to be 1515 nm as a detailed example of the respective embodiments, the zero dispersion wavelength is promptly established so that it is made roughly coincident with the zero dispersion wavelength of a positive dispersion slope optical fiber such as TRUE WAVE which is connected thereto.

Furthermore, although, in the first embodiment, the refractive index profile structure of a dispersion slope compensating optical fiber is made into a W-shaped refractive index profile structure shown by (a) in FIG. 1, and in the second embodiment, the refractive index profile structure of a dispersion slope optical fiber is made into the structure shown by (a) in FIG. 5, the refractive index profile structure of a dispersion slope compensating optical fiber is not especially limited. It may be adequately established. However, by the refractive index profile structure of a dispersion slope compensating optical fiber being made similar to the refractive index profile structure of the respective embodiments and being established to be $\Delta 2/\Delta 1 \leq -0.45$, it is possible to easily form a dispersion slope compensating optical fiber whose average dispersion slope in the predetermined wavelength band in the range from 1530 nm to 1610 nm in wavelength becomes $-0.6$ ps/nm²/km or less.

Accordingly, if the average dispersion slope in the predetermined wavelength band in the range from 1530 nm to 1610 nm in wavelength is established to be $-0.6$ ps/nm²/km or less, the dispersion value in said predetermined wavelength band is $-6$ ps/nm/km or less, and the value obtained by dividing said dispersion value of said dispersion slope becomes a positive value which is 160 or less, the DPS value is established with respect to a positive dispersion slope optical fiber in which the chromatic dispersion value is positive is set since the maximum value of the DPS of an optical fiber currently used for an optical transmission system, etc., is approximately 160, whereby it is possible to prevent a remaining of the dispersion of such an amount as may influence on optical transmission. Therefore, by a dispersion slope compensating optical fiber according to the invention, the length of which is short, both dispersion slope and dispersion value of all positive dispersion slope optical fibers can be compensated, and a high-density and high bit rate wavelength division multiplex transmission of high reliability is enabled.

Furthermore, the refractive index profile structure of a dispersion slope compensating optical fiber is made into a refractive index profile structure which is similar to those of the respective embodiments, that is, is established to be $\Delta 2/\Delta 1 \leq -0.6$, whereby it is possible to easily form a dispersion slope compensating optical fiber whose average dispersion slope in the predetermined range in the range from 1530 nm to 1610 nm in wavelength becomes $-1$ ps/nm²/km or less, and it is possible to obtain a dispersion slope compensating optical fiber which is able to have a positive dispersion slope of TRUE WAVE, etc., by a much shorter length.

And, if the dispersion value in said predetermined wavelength band is made $-12.5$ ps/nm/km or less, and the value obtained by dividing the dispersion value by said dispersion slope is made 15 through 60, it is possible to compensate the dispersion slope of TRUE WAVE at a high reliability by using a dispersion slope compensating optical fiber, the length of which is, for example, one-fifteenth, according to the invention, and almost no dispersion is permitted to remain in a wavelength from 1530 nm to 1610 nm.

Furthermore, in the respective embodiments, wherein the outer diameter of the center core 3 is "a" and the outer diameter of the side core layer 4 is "b", 3 $\mu$m$\leq$a$\leq$6 $\mu$m, 8 $\mu$m$\leq$b$\leq$12 $\mu$m, and 0.4$\leq$a/b$\leq$0.5 are established. However, these values "a", "b" and "a/b" are not especially limited. They may be adequately established. For example, $0.375 \leq a/b \leq -0.55$ may be acceptable.

Furthermore, although, in the second embodiment, germanium (Ge) is doped onto the inner clad layer 5a and the relative refractive index difference $\Delta 3a$ of the inner clad layer 5a with respect to pure $SiO_2$ glass is established to 0.35% or more, it is not necessary that the relative refractive index difference $\Delta 3a$ of the inner clad layer 5a with respect to pure $SiO_2$ glass is 0.35% or more. That is, the relative refractive index difference $\Delta 3a$ may be 0.35% or less.

Thus, if said relative refractive index difference $\Delta 3a$ is increased as shown in FIG. 6 by doping a dopant such as germanium which increases the refractive index, onto the inner clad layer 5a (onto the area which is greater by at least six times than the outer diameter of the side core layer with the center thereof made identical to that of the side core layer 4) even though the relative refractive index difference $\Delta 3a$ is a small value, it is possible to further decrease the transmission loss of a dispersion slope compensating optical fiber in comparison to a case where the relative refractive index difference $\Delta 3a$ is zero. Furthermore, if the relative refractive index difference $\Delta 3a$ is established to be 0.35% or more, it is possible to remarkably decrease the transmission loss of a dispersion slope compensating optical fiber in comparison to a case where the value of the relative refractive index difference $\Delta 3a$ is 0.35% or less.

Furthermore, in the respective embodiments described above, a description was given of an example in which a dispersion slope compensating optical fiber is connected to TRUE WAVE which is one of the examples of positive dispersion slope optical fibers and is applied to a wavelength division multiplex transmission system. However, a dispersion slope compensating optical fiber can be connected to a positive dispersion slope optical fiber other than TRUE WAVE, wherein even though the positive dispersion slope optical fiber is an optical fiber other than TRUE WAVE, the positive dispersion slope optical fiber and a dispersion slope compensating optical fiber according to the invention are able to be connected to each other and applied to a wavelength division multiplex transmission system, and it is possible to approach the dispersion in a wavelength from 1530 nm to 1610 nm to zero in the entire area of the wavelength used. Therefore, effects which are similar to those of each of the embodiments can be obtained.

However, since a four-wave mixing can be suppressed without fail by connecting a dispersion shifted optical fiber according to the invention to TRUE WAVE as in the respective embodiments and applying the same to a wavelength division multiplex transmission system, it is preferable that a dispersion compensating optical fiber according to the invention is connected to TRUE WAVE and is applied to a wavelength division multiplex transmission system.

INDUSTRIAL APPLICABILITY

As described above, a dispersion slope compensating optical fiber according to the invention is connected to an optical transmission line having a positive dispersion slope, and even with a short fiber length, both dispersion of an optical transmission line and a dispersion slope are compensated. Therefore, the dispersion slope compensating optical fiber is suitable to carry out high-density and high bit rate wavelength division multiplex optical transmission of high reliability.

What is claimed is:

1. A dispersion slope compensating optical fiber being featured in that, in a range from 1530 nm to 1610 nm in wavelength, the average dispersion slope on a wavelength band in the predetermined range is made −0.6 ps/nm$^2$/km or less, the dispersion value on the predetermined wavelength band is made −6 ps/nm/km or less, and the value (DPS) obtained by dividing the dispersion value by said dispersion slope is made a positive value which is less than 160.

2. A dispersion slope compensating optical fiber as set forth in claim 1, wherein the average dispersion slope on the wavelength band in the predetermined range is made −1 ps/nm2/km or less, the dispersion value on the predetermined wavelength band is made −12.5 ps/nm/km or less, and the value (DPS) obtained by dividing the dispersion value by said dispersion slope becomes 12 through 80.

3. A dispersion slope compensating optical fiber as set forth in claim 2 being featured in that a dispersion slope compensating optical fiber formed so as to cover the outer circumferential side of the center core by side core layers and cover the outer circumferential side of the side core layers by a clad layer, wherein $\Delta 1 > \Delta 3 > \Delta 2$, $\Delta 2/\Delta 1 \leq -0.45$, and $\Delta 1 \leq -1.2\%$ are established where the relative refractive index difference of said center core with respect to pure $SiO_2$ glass is $\Delta 1$, the relative refractive index difference of said side core layer with respect to pure $SiO_2$ glass is $\Delta 2$, and the relative refractive index difference of said clad layer with respect to pure $SiO_2$ glass is $\Delta 3$.

4. A dispersion slope compensating optical fiber as set forth in claim 3, where $\Delta 2/\Delta 1 \leq -0.6$ is established.

5. A dispersion slope compensating optical fiber as set forth in claim 4, wherein $3 \mu m \leq a \leq 6 \mu m$, $8 \mu m \leq b \leq 12 \mu m$, and $0.375 \leq a/b \leq 0.55$ are established where the outer diameter of said center core is "a" and the outer diameter of said side core layer is "b".

6. A dispersion slope compensating optical fiber as set forth in claim 3, wherein a dopant is added onto said clad layer, which increases the refractive index at an area greater by at least six times than that of the outer diameter of the side core layer with the center of the side core layer used as the center of the dopant.

7. A dispersion slope compensating optical fiber as set forth in claim 6, wherein the relative refractive index difference of the area, to which a dopant for increasing said refractive index is added with respect to pure $SiO_2$ glass, is established to be 0.35% or more.

8. A dispersion slope compensating optical fiber as set forth in claim 7, wherein said dopant is germanium.

9. A dispersion slope compensating optical fiber as set forth in claim 3, wherein $3 \mu m \leq a \leq 6 \mu m$, $8 \mu m \leq b \leq 12 \mu m$, and $0.375 \leq a/b \leq 0.55$ are established where the outer diameter of said center core is "a" and the outer diameter of said side core layer is "b".

10. A dispersion slope compensating optical fiber as set forth in claim 1, being featured in that a dispersion slope compensating optical fiber formed so as to cover the outer circumferential side of the center core by side core layers and cover the outer circumferential side of the side core layers by a clad layer, wherein $\Delta 1 > \Delta 3 > \Delta 2$, $\Delta 2/\Delta 1 \leq -0.45$, and $\Delta 1 \leq -1.2\%$ are established where the relative refractive index difference of said center core with respect to pure $SiO_2$ glass is $\Delta 1$, the relative refractive index difference of said side core layer with respect to pure $SiO_2$ glass is $\Delta 2$, and the relative refractive index difference of said clad layer with respect to pure $SiO_2$ glass is $\Delta 3$.

11. A dispersion slope compensating optical fiber as set forth in claim 3, where $\Delta 2/\Delta 1 \leq -0.6$ is established.

12. A dispersion slope compensating optical fiber as set forth in claim 11, wherein $3 \mu m \leq a \leq 6 \mu m$, $8 \mu m \leq b \leq 12 \mu m$, and $0.375 \leq a/b \leq 0.55$ are established where the outer diameter of said center core is "a" and the outer diameter of said side core layer is "b".

13. A dispersion slope compensating optical fiber as set forth in claim 3, wherein a dopant is added onto said clad layer, which increases the refractive index at an area greater by at least six times than that of the outer diameter of the side core layer with the center of the side core layer used as the center of the dopant.

14. A dispersion slope compensating optical fiber as set forth in claim 13, wherein the relative refractive index difference of the area, to which a dopant for increasing said refractive index is added with respect to pure $SiO_2$ glass, is established to be 0.35% or more.

15. A dispersion slope compensating optical fiber as set forth in claim 13 wherein said dopant is germanium.

16. A dispersion slope compensating optical fiber as set forth in claim 3, wherein $3 \mu m \leq a \leq -6 \mu m$, $8 \mu m \leq b \leq 12 \mu m$, and $0.375 \leq a/b \leq 0.55$ are established where the outer diameter of said center core is "a" and the outer diameter of said side core layer is "b".

* * * * *

UNITED STATES△ PATENT AND TRADEMARK OFFICE
CERTIFICATE OF CORRECTION

PATENT NO.   : 6,009,221
DATED         : December 28, 1999
INVENTOR(S) : Tsuda

It is certified that error appears in the above-identified patent and that said Letters Patent is hereby corrected as shown below:

<u>Item [57], ABSTRACT,</u>
Line 11, "$\Delta 1)\Delta 3)\Delta 2$" should read -- $\Delta 1 > \Delta 3 > \Delta 2$ --

<u>Column 3,</u>
Line 37, "$\Delta 1 > \Delta 3)\Delta 2$" should read -- $\Delta 1 > \Delta 3 > \Delta 2$ --

<u>Column 6,</u>
Line 31, " $\Delta 1)\Delta 3)\Delta 2$" should read -- $\Delta 1 > \Delta 3 > \Delta 2$ --

<u>Column 8,</u>
Line 12, " $\Delta 1)\Delta 3)\Delta 2$" should read -- $\Delta 1 > \Delta 3 > \Delta 2$ --

<u>Claim 2,</u>
Line 23, "ps/nm2/km" should read -- $ps/nm^2/km$ --

Signed and Sealed this

Twenty-seventh Day of November, 2001

*Attest:*

NICHOLAS P. GODICI
*Attesting Officer*   *Acting Director of the United States Patent and Trademark Office*

UNITED STATES PATENT AND TRADEMARK OFFICE
CERTIFICATE OF CORRECTION

PATENT NO.    : 6,009,221
DATED         : December 28, 1999
INVENTOR(S)   : Tsuda It is certified that error appears in the above-identified patent and that said Letters Patent is hereby corrected as shown below:

<u>Column 17,</u>
Line 33, "$\Delta 1 \leq -1.2\%$" should read -- $\Delta 1 \geq -1.2\%$ --.

Signed and Sealed this

Eighteenth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,009,221
DATED : December 28, 1999
INVENTOR(S) : Tsuda

It is certified that error appears in the above-identified patent and that said Letters Patent is hereby corrected as shown below:

Column 17,
Line 33, "$\Delta 1 \geqq -1.2\%$" should read -- $\Delta 1 \geqq 1.2\%$ Signed and Sealed this Second Day of November, 2004

JON W. DUDAS
*Director of the United States Patent and Trademark Office*